US009383225B2

(12) United States Patent
Bolick et al.

(10) Patent No.: US 9,383,225 B2
(45) Date of Patent: Jul. 5, 2016

(54) APPARATUS AND METHOD FOR READING GAUGES AND OTHER VISUAL INDICATORS IN A PROCESS CONTROL SYSTEM OR OTHER DATA COLLECTION SYSTEM

(75) Inventors: Jack D. Bolick, Scottsdale, AZ (US); Umesh J. Patel, Scottsdale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 1540 days.

(21) Appl. No.: 12/234,879

(22) Filed: Sep. 22, 2008

(65) Prior Publication Data

US 2009/0322884 A1 Dec. 31, 2009

Related U.S. Application Data

(60) Provisional application No. 61/076,501, filed on Jun. 27, 2008.

(51) Int. Cl.
*G01D 4/00* (2006.01)
*G01D 5/39* (2006.01)

(52) U.S. Cl.
CPC .............. *G01D 4/008* (2013.01); *G01D 5/39* (2013.01); *Y02B 90/247* (2013.01); *Y04S 20/50* (2013.01)

(58) Field of Classification Search
USPC ......................................................... 348/160
See application file for complete search history.

(56) References Cited

U.S. PATENT DOCUMENTS

| 4,811,011 | A | * | 3/1989 | Sollinger | ................. | 340/870.02 |
|---|---|---|---|---|---|---|
| 5,027,526 | A | | 7/1991 | Crane | | |
| 5,870,140 | A | * | 2/1999 | Gillberry | .................... | 348/160 |
| 6,208,266 | B1 | * | 3/2001 | Lyons et al. | ............. | 340/870.02 |
| 6,244,759 | B1 | * | 6/2001 | Russo | ........................... | 396/428 |
| 6,499,016 | B1 | | 12/2002 | Anderson | | |
| 6,721,001 | B1 | | 4/2004 | Berstis | | |
| 2003/0195982 | A1 | * | 10/2003 | Motoyama et al. | ........... | 709/238 |
| 2004/0032504 | A1 | * | 2/2004 | Shan et al. | ............... | 348/207.99 |
| 2004/0105006 | A1 | | 6/2004 | Lazo et al. | | |

(Continued)

FOREIGN PATENT DOCUMENTS

| DE | 36 34 628 A1 | 4/1987 |
|---|---|---|
| EP | 1 501 029 A2 | 1/2004 |

(Continued)

OTHER PUBLICATIONS

"PanOS Platform, Unified Location Management Platform," PanGo, 2007, 2 pages.

(Continued)

*Primary Examiner* — Angela Nguyen

(57) ABSTRACT

A portable apparatus includes a camera configured to capture images of multiple visual indicators. Each visual indicator, such as a gauge or meter, includes a display configured to present a reading. The portable apparatus also includes a recording device configured to store and/or transmit information associated with the captured images of the visual indicators. The camera and/or the recording device could be configured to identify, using the images, the readings presented on the displays of the visual indicators, and the information associated with the captured images could include the readings. Also, the camera could be configured to be mounted on each visual indicator in order to capture one or more images of the visual indicator's display and to be removed from the visual indicator after the one or more images are captured.

20 Claims, 3 Drawing Sheets

(56) References Cited

U.S. PATENT DOCUMENTS

| | | | | |
|---|---|---|---|---|
| 2004/0137895 | A1* | 7/2004 | Gordon | 455/420 |
| 2005/0062677 | A1 | 3/2005 | Nixon et al. | |
| 2005/0231354 | A1* | 10/2005 | Riedel et al. | 340/531 |
| 2005/0246295 | A1* | 11/2005 | Cameron | 705/412 |
| 2006/0036967 | A1* | 2/2006 | Crichlow | 715/781 |
| 2006/0255265 | A1 | 11/2006 | Dalzell | |
| 2008/0122641 | A1 | 5/2008 | Amidi | |
| 2008/0123934 | A1 | 5/2008 | Amidi | |
| 2008/0308631 | A1* | 12/2008 | Mitschele et al. | 235/384 |
| 2009/0010484 | A1 | 1/2009 | Amidi | |

FOREIGN PATENT DOCUMENTS

| | | |
|---|---|---|
| EP | 1 657 610 A2 | 5/2006 |
| JP | 2004128541 | 4/2004 |
| WO | WO 2004/057325 A1 | 7/2004 |
| WO | WO 2008/067236 A2 | 6/2008 |

OTHER PUBLICATIONS

"Ekahau T301-A Wi-Fi Tag," ekahau, 2007, 2 pages.

"IntelaTrac PKS Redefines Field Data Collection and Management," Honeywell, Feb. 2006, 2 pages.

Honeywell Process Solutions, "IntelaTrac PKS," Honeywell, 2 pages.

Honeywell Process Solutions, "Mobile Station," Honeywell, 2 pages.

"Improve Maintenance Efforts with DocuMint," Honeywell, Feb. 2006, 3 pages.

"Lumidor Minimax XT," Honeywell, Dec. 2005, 4 pages.

"Wireless Gauge Reader (WGR—100)", Cypress Systems, 2008, 2 pages.

"Harry Sim's cool new thing . . . ", ControlGlobal.com, submitted by Walt Boyes, May 29, 2008, 2 pages.

"Starrett Digitape 25", 4 pages.

Hai D. Pham, et al., "Personnel Field Device for Process Control and Other Systems and Related Method", U.S. Appl. No. 61/094,788, filed Sep. 5, 2008.

* cited by examiner

APPARATUS AND METHOD FOR READING GAUGES AND OTHER VISUAL INDICATORS IN A PROCESS CONTROL SYSTEM OR OTHER DATA COLLECTION SYSTEM

CROSS-REFERENCE TO RELATED APPLICATIONS

This application claims priority under 35 U.S.C. §119(e) to U.S. Provisional Application No. 61/076,501 filed on Jun. 27, 2008, which is hereby incorporated by reference.

TECHNICAL FIELD

This disclosure relates generally to data collection and more specifically to an apparatus and method for reading gauges and other visual indicators in a process control system or other data collection system.

BACKGROUND

In many processing facilities, gauges and other visual indicators are used to provide local indications of various process parameters or variables. For example, in facilities such as oil refineries and petrochemical complexes, hundreds or thousands of gauges may be used to visually identify pressures, temperatures, or flow rates at different points in the facilities. In many conventional facilities, personnel periodically roam from gauge to gauge and manually record the readings of the gauges.

SUMMARY

This disclosure provides an apparatus and method for reading gauges and other visual indicators in a process control system or other data collection system.

In a first embodiment, a portable apparatus includes a camera configured to capture images of multiple visual indicators. Each visual indicator includes a display configured to present a reading. The portable apparatus also includes a recording device configured to store and/or transmit information associated with the captured images of the visual indicators.

In particular embodiments, the camera is configured to be mounted on each visual indicator in order to capture one or more images of the visual indicator's display and to be removed from the visual indicator after the one or more images are captured.

In other particular embodiments, at least one of the camera and the recording device is configured to identify, using the images, the readings presented on the displays of the visual indicators (such as by using optical character recognition). Also, the information associated with the captured images includes the readings.

In yet other particular embodiments, at least one of the camera and the recording device is further configured to associate each reading with a timestamp and an identifier associated with one of the visual indicators. The identifiers could include radio frequency identification (RFID) identifiers.

In still other particular embodiments, the visual indicators include one or more gauges and/or one or more meters. Also, the displays include one or more textual displays and/or one or more dials.

In a second embodiment, a method includes capturing an image of a first visual indicator's display using a reading device. The first display presents a first reading. The method also includes capturing an image of a second visual indicator's display using the reading device. The second display presents a second reading. The method further includes storing and/or transmitting information associated with the captured images.

In a third embodiment, a system includes multiple visual indicators each having a display configured to present a reading. The system also includes a reading device configured to capture images of two or more of the visual indicators and to store and/or transmit information associated with the captured images.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
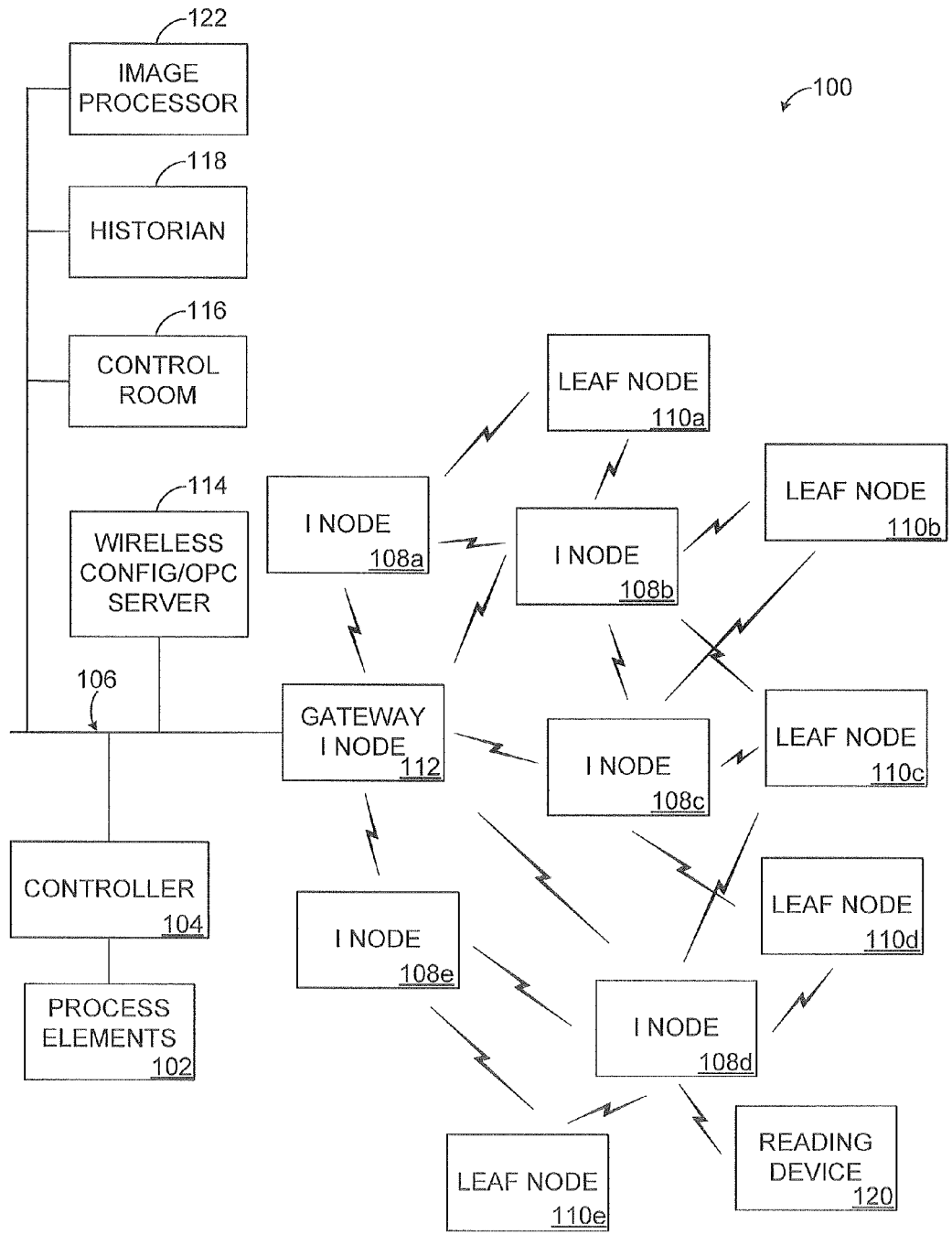
FIG. 1 illustrates an example process control system according to this disclosure.

FIG. 1 illustrates an example process control system 100 according to this disclosure. The embodiment of the process control system 100 shown in FIG. 1 is for illustration only. Other embodiments of the process control system 100 could be used without departing from the scope of this disclosure.

In this example embodiment, the process control system 100 includes one or more process elements 102. The process elements 102 represent components in a process system that perform any of a wide variety of functions. For example, the process elements 102 could represent sensors, actuators, or any other or additional industrial equipment in a processing environment. Each process element 102 includes any suitable structure for performing one or more functions in a process system. Also, a process system may represent any system or portion thereof configured to process one or more materials in some manner.

A controller 104 is coupled to the process elements 102. The controller 104 controls the operation of one or more of the process elements 102. For example, the controller 104 could receive information associated with the process system, such as sensor measurements from some of the process elements 102. The controller 104 could use this information to provide control signals to others of the process elements 102, thereby adjusting the operation of those process elements 102. The controller 104 includes any hardware, software, firmware, or combination thereof for controlling one or more process elements 102. The controller 104 could, for example, represent a computing device executing a MICROSOFT WINDOWS operating system.

A network 106 facilitates communication between various components in the system 100. For example, the network 106 may communicate Internet Protocol (IP) packets, frame relay frames, Asynchronous Transfer Mode (ATM) cells, or other suitable information between network addresses. The network 106 may include one or more local area networks, metropolitan area networks, wide area networks (WANs), all or a portion of a global network, or any other communication system or systems at one or more locations. In some embodiments, the network 106 could represent multiple networks, such as a pair of Ethernet networks or a FAULT TOLERANT ETHERNET (FTE) network from HONEYWELL INTERNATIONAL INC. (which includes a redundant pair of Ethernet networks).

In FIG. 1, the process control system 100 also includes one or more wireless networks for communicating with wireless sensors or other devices. In this example, a wireless network includes infrastructure nodes ("I nodes") 108a-108e, leaf nodes 110a-110e, and a gateway infrastructure node 112.

The infrastructure nodes 108a-108e and the leaf nodes 110a-110e engage in wireless communications with each other. For example, the infrastructure nodes 108a-108e may receive data transmitted over the network 106 (via the gateway infrastructure node 112) and wirelessly communicate the data to the leaf nodes 110a-110e. Similarly, the leaf nodes 110a-110e may wirelessly communicate data to the infrastructure nodes 108a-108e for forwarding to the network 106 (via the gateway infrastructure node 112). In addition, the infrastructure nodes 108a-108e may wirelessly exchange data with one another. In this way, the infrastructure nodes 108a-108e form a wireless network capable of providing wireless coverage to leaf nodes and other devices in a specified area, such as a large industrial complex.

In this example, the nodes 108a-108e and 110a-110e are divided into infrastructure nodes and leaf nodes. The infrastructure nodes 108a-108e typically represent routing devices that can store and forward messages for other devices. Infrastructure nodes 108a-108e are typically line-powered devices, meaning these nodes receive operating power from an external source. Infrastructure nodes 108a-108e are typically not limited in their operations since they need not minimize power consumption to increase the operational life of their internal power supplies. On the other hand, leaf nodes 110a-110e typically represent devices powered by local power supplies, such as nodes that receive operating power from internal batteries or other internal power supplies. Leaf nodes 110a-110e are often more limited in their operations in order to help preserve the operational life of their internal power supplies. The leaf nodes 110a-110e typically represent non-routing devices that do not store and forward messages for other devices.

The nodes 108a-108e and 110a-110e could also include other functionality, such as functionality for generating or using data communicated over the wireless network. For example, the leaf nodes 110a-110e could represent wireless sensors used to measure various characteristics within an industrial facility. The sensors could collect and communicate sensor readings to the controller 104 via the typically represent node 112. The leaf nodes 110a-110e could also represent actuators that receive control signals from the controller 104 and adjust the operation of the industrial facility. In this way, the leaf nodes may include or operate in a similar manner as the process elements 102 physically connected to the controller 104. The leaf nodes 110a-110e could further represent handheld user devices (such as INTELATRAC devices from HONEYWELL INTERNATIONAL INC.), mobile stations, programmable logic controllers, or any other or additional devices. The infrastructure nodes 108a-108e may also include any of the functionality of the leaf nodes 100a-110e or the controller 104.

The gateway infrastructure node 112 communicates wirelessly with, transmits data to, and receives data from one or more infrastructure nodes and possibly one or more leaf nodes. The gateway infrastructure node 112 may convert data between protocol(s) used by the network 106 and protocol(s) used by the nodes 108a-108e and 110a-110e. For example, the gateway infrastructure node 112 could convert Ethernet-formatted data transported over the network 106 into a wireless protocol format (such as an IEEE 802.11a, 802.11b, 802.11g, 802.11n, 802.15.3, 802.15.4, or 802.16 format) used by the nodes 108a-108e and 110a-110e. The gateway infrastructure node 112 could also convert data received from one or more of the nodes 108a-108e and 110a-110e into Ethernet-formatted data for transmission over the network 106. In addition, the gateway infrastructure node 112 could support various functions, such as network creation and security, used to create and maintain a wireless network. The gateway infrastructure node 112 includes any suitable structure for facilitating communication between components or networks using different protocols.

In particular embodiments, the various nodes in the wireless network of FIG. 1 form a mesh network communicating at 2.4 GHz or 5.8 GHz. A particular example of a wireless mesh network is the ONEWIRELESS network from HONEYWELL INTERNATIONAL INC. Also, in particular embodiments, data can be injected into the wireless mesh network through the infrastructure nodes or leaf nodes, thus providing versatile, multifunctional, plant-wide coverage for wireless sensing, asset location tracking, personnel tracking, wireless communications, and any other or additional functionality as desired.

A wireless configuration and OLE for Process Control (OPC) server 114 can configure and control various aspects of the process control system 100. For example, the server 114 could configure the operation of the nodes 108a-108e, 110a-110e, and 112. The server 114 could also support security in the process control system 100, such as by distributing cryptographic keys or other security data to various components in the process control system 100 (like the nodes 108a-108e, 110a-110e, and 112). The server 114 includes any hardware, software, firmware, or combination thereof for configuring wireless networks and providing security information.

A control room 116 in the process control system 100 typically represents a room or other area containing operator stations (such as desktop computers or computer terminals) used by human operators. The operator stations in the control room 116 typically receive data associated with operation of the process control system. The operator stations in the control room 116 also typically include various displays presenting that information to human operators. The operator stations in the control room 116 further typically allow the operators to review current and historical data associated with the operation of the process control system and to adjust the operation of the process control system. As a particular example, the operator stations often allow the operators to make manual adjustments to controllers 104 or to otherwise control the operation of the process control system from the control room 116.

A historian 118 often collects and stores information about the operation of the process control system. For example, as described in more detail below, the historian 118 could record information about gauges and other visual indicators associated with the process control system. The historian 118 includes any suitable structure for storing and facilitating retrieval of information, such as one or more databases.

In one aspect of operation, the process system being monitored and controlled by the process control system 100 includes various gauges or other visual indicators. For example, the process system could include numerous pressure, temperature, flow rate, or other gauges located in various positions within the process system. Often times, personnel periodically roam from gauge to gauge and manually record the readings of the gauges.

In accordance with this disclosure, one or more personnel carry and use reading devices 120 to help automate the collection of data from gauges or other visual indicators. Each of the reading devices 120 includes a camera and a recording device. The camera and recording device could represent distinct physical units (such as two units wired together or communicating wirelessly), or the camera and recording device could be integrated into a single physical unit. In particular embodiments, the reading devices 120 act as leaf nodes in the sense that they can communicate wirelessly with the infrastructure nodes 108a-108e (and possibly directly with the gateway infrastructure node 112) to receive wireless service in different areas of a processing facility or other area.

The camera of a reading device 120 captures an image of a gauge or other visual indicator being read. For example, the camera could be attached to, mounted on, or otherwise associated with the gauge or other visual indicator. Optical character recognition or other processing could occur in the camera to identify the actual reading of the gauge or other visual indicator based on the captured image. A "reading" generally denotes the value currently displayed or otherwise presented by a gauge or other visual indicator. The camera includes any suitable structure for capturing images, such as a low-power charge coupled device (CCD) or a complimentary metal oxide semiconductor (CMOS) camera.

The recording device of a reading device 120 receives information from the camera, such as an image or a reading associated with a gauge or other visual indicator. If an image is received, optical character recognition or other processing could occur in the recording device to identify the actual reading of the gauge or other visual indicator. The recording device could also receive identification information associated with the gauge or other visual indicator being read. The identification information could represent a radio frequency identification (RFID) identifier, bar code identifier, scanned alphanumeric identifier, or other identifier. The recording device could associate the reading or image with the identification information and a timestamp. The recording device could store or transmit the information, such as by transmitting the information over a wireless network formed by the infrastructure nodes. The recording device includes any suitable structure for associating information with images or readings of gauges or other visual indicators.

Information (such as images, readings, identifiers, and timestamps) from the reading devices 120 could be provided to any suitable destination(s) and used in any suitable way(s). For example, images or readings from the reading devices 120 could be sent to the control room 116 for display to operators. Images from the reading devices 120 could also be sent to an image processor 122, which could process the images. As a particular example, if a gauge or other indicator uses a textual display to present its current reading, the image processor 122 could perform optical character recognition to extract the text from an image. If a gauge or other indicator uses a dial to present its current reading, the image processor 122 could perform other types of processing to estimate or identify the current reading. The same or similar processing could also occur in the cameras or recording devices of the reading devices 120, in the control room 116, or in any other suitable location(s). Readings of gauges or other indicators (from the reading devices, image processor, or other source) could further be provided to controllers 104 for use in controlling the process system. In addition, readings or images could be provided to the historian 118 for storage and later use.

In this way, the reading devices 120 can be used by multiple personnel to collect readings from gauges or other indicators in a consistent manner. Moreover, the readings can be timestamped and automatically associated with the proper gauges or other indicators. Further, this reduces the likelihood that manually-recorded readings are incorrect, lost, or not made available for use. In addition, personnel are able to inspect their surroundings in the process system while they are capturing readings from the gauges or other indicators. As a result, the personnel could look for leaks or other problems as they are moving to and from different gauges or other indicators. Additional details regarding the reading devices 120 are provided below.

Although FIG. 1 illustrates one example of a process control system 100, various changes may be made to FIG. 1. For example, the process control system 100 could include any number of process elements, controllers, networks (wired or wireless), infrastructure nodes (gateway or other), leaf nodes, servers, control rooms, historians, image processors, gauges or other visual indicators, and reading devices. Also, the functional division shown in FIG. 1 is for illustration only. Various components in FIG. 1 could be combined, subdivided, or omitted and additional components could be added according to particular needs. In addition, FIG. 1 illustrates one example operational environment where automated readings of gauges or other visual indicators could be used. This functionality could be used with any other suitable system. For instance, this functionality could be used with any other suitable data collection system (or any other system that involves the collection of data).

Figure 2:
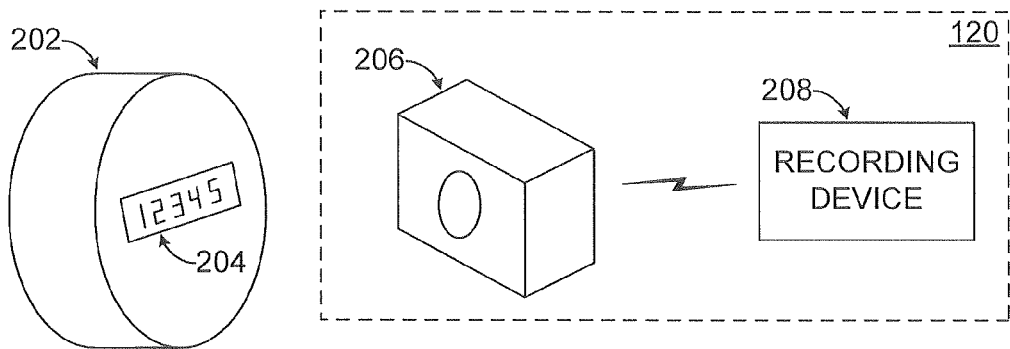
FIG. 2 illustrates an example reading device for reading gauges or other visual indicators in a process control system or other system according to this disclosure.

FIG. 2 illustrates an example reading device 120 for reading gauges or other visual indicators in a process control system or other system according to this disclosure. The embodiment of the reading device 120 shown in FIG. 2 is for illustration only. Other embodiments of the reading device 120 could be used without departing from the scope of this disclosure. Also, the reading device 120 shown in FIG. 2 could be used with any suitable process control or non-process control system.

As shown in FIG. 2, the reading device 120 is used with one or more gauges 202. Each gauge 202 represents any suitable structure capable of measuring one or more conditions. The gauge 202 could, for example, represent a temperature, pressure, or flow rate gauge. The gauge 202 could also represent a usage meter, such as a gas, water, or electrical meter. Any other suitable gauge 202 could be used here. The gauge 202 includes a display 204, which identifies the current reading of the gauge 202. In this example, the display 204 presents a numerical (textual) value identifying the gauge's current reading. However, the display 204 could include any other type of indicator, such as a dial. Also, the gauge 202 could include one or multiple displays 204 identifying one or multiple readings.

In this example embodiment, the reading device 120 includes a camera 206, which can be used to capture images or readings of the gauge 202 (along with any number of other gauges). The camera 206 could be designed to be attached to, mounted on, pointed at, or otherwise associated with the gauge 202. The camera 206 can capture one or multiple images containing the display 204, so the images contain the readings of the gauge 202 at particular points in time. The camera 206 could optionally process the images (such as by extracting actual gauge readings from the images), or the camera 206 could store and forward the images without further processing. The camera 206 includes any suitable structure for capturing images or readings of at least one gauge or other visual indicator. The camera 206 could, for example, represent a low-power CCD or CMOS-based camera. One example embodiment of the camera 206 is shown in FIG. 3, which is described below.

The reading device 120 also includes a recording device 208, which collects information from the camera 206. For example, the recording device 208 could receive images or readings associated with the gauge 202 from the camera 206. The recording device 208 could also receive identification information associated with the gauge 202, such as a unique RFID identifier. The recording device 208 could associate the received images or readings with the received identification information and timestamp the information. The recording device 208 could forward this information, such as over a wireless network (like the one created by the infrastructure nodes 108a-108e). The recording device 208 could also store this information locally for later retrieval, such as after the recording device 208 or the reading device 120 is placed in a docking cradle or otherwise physically coupled to or wirelessly communicating with a computing device in a process control or other system. The recording device 208 includes any suitable structure for receiving information associated with gauges or other indicators from a camera and associating that information with other information. One example embodiment of the recording device 208 is shown in FIG. 3, which is described below. In particular embodiments, the recording device 208 could represent an INTELATRAC device from HONEYWELL INTERNATIONAL INC., which has been modified to include the recording device functionality described in this patent document.

Although FIG. 2 illustrates one example of a reading device 120 for reading gauges or other visual indicators in a process control system or other system, various changes may be made to FIG. 2. For example, the reading device 120 could be used to collect readings from any number of gauges 202, and the gauges 202 may or may not be similar in size or structure. Also, the camera 206 is shown in FIG. 2 as being in wireless communication with a separate recording device 208. In other embodiments, the camera 206 can be physically wired to the recording device 208, or the camera 206 and the recording device 208 can form a single physical unit.

Figure 3:
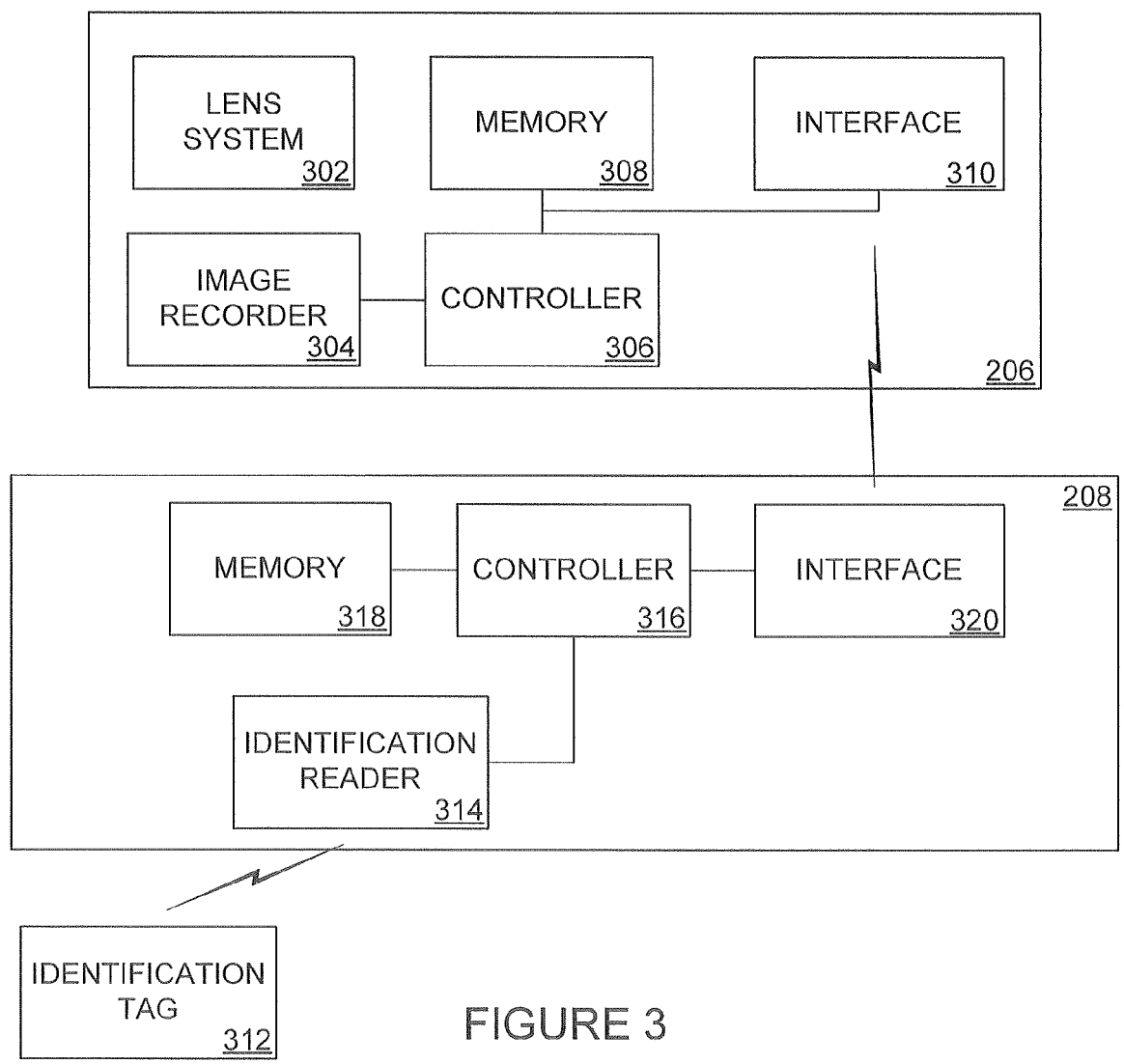
FIG. 3 illustrates additional details of an example reading device for reading gauges or other visual indicators in a process control system or other system according to this disclosure.

FIG. 3 illustrates additional details of an example reading device 120 for reading gauges or other visual indicators in a process control system or other system according to this disclosure. The embodiment of the camera 206 and recording device 208 shown in FIG. 3 are for illustration only. Other embodiments of the camera 206 and recording device 208 could be used without departing from the scope of this disclosure.

As shown in FIG. 3, the camera 206 includes a lens system 302 and an image recorder 304. The lens system 302 includes a lens for focusing light onto the image recorder 304. The lens system 302 could also include a mechanism for moving the lens (to focus an image being captured) and a lens housing (to protect the lens). The image recorder 304 captures data representing the image being provided by the lens system 302. The image recorder 304 includes any suitable structure for capturing images, such as a CMOS or CCD image sensor. Note that other camera elements could be used here to facilitate the capture of images, such as a flash or auto-focus components.

The camera 206 also includes a controller 306, which controls the overall operation of the camera 206. For example, the controller 306 could control the capture of images by the image recorder 304. The controller 306 could also process image data generated by the image recorder 304 (such as to identify actual readings) or store the image data (or any generated readings). The controller 306 could further control the retrieval and transmission of the image data, such as to the recording device 208. The controller 306 includes any hardware, software, firmware, or combination thereof for controlling the overall operation of the camera 206. As particular examples, the controller 306 could represent a processor, microprocessor, microcontroller, field programmable gate array, or other processing or control device.

A memory 308 is coupled to the controller 306. The memory 308 stores information used, collected, or generated by the camera 206. For example, the memory 308 could store image data representing one or more captured images. The memory 308 could also store actual readings of gauges or other visual indicators, such as textual information extracted from images by the controller 306 or other component. The memory 308 could store any other or additional information. The memory 308 includes any suitable volatile and/or non-volatile storage and retrieval device(s).

The camera 206 further includes an interface 310. The interface 310 facilitates communication between the camera 206 and the recording device 208. The interface 310 includes any suitable structure facilitating communication with the camera 206. The interface 310 could, for example, represent an interface to a wired connection between the camera 206 and the recording device 208. The interface 310 could also represent a wireless transceiver and antenna, such as a Bluetooth transceiver.

In this example, the recording device 208 receives information from the camera 206 and from an identification tag 312. The identification tag 312 provides an identifier associated with a gauge or other indicator to the recording device 208. The identification tag 312 includes any suitable structure for providing an identifier. The identification tag 312 could, for example, represent a passive or active RFID tag that communicates a unique RFID identifier to an external reader. Note that other types of identification could be used here, such as a bar code or an alphanumeric code that is optically scanned by the recording device 208.

As shown in FIG. 3, the recording device 208 includes an identification reader 314. The identification reader 314 is capable of receiving information from the identification tag 312. For example, the identification reader 314 could receive wireless signals from the identification tag 312, where the wireless signals contain a unique identifier associated with the gauge or other indicator being read. If the identification tag 312 represents a passive identification tag, the identification reader 314 could energize the passive tag by transmitting electromagnetic waves to the identification tag 312. The identification reader 314 includes any suitable structure for receiving identifiers, such as an RFID reader. Note that other types of identification devices could be used here, such as an optical scanner for reading bar codes or alphanumeric codes.

Identifiers obtained by the identification reader 314 are provided to a controller 316. The controller 316 also receives images or readings associated with one or more gauges or other visual indicators from the camera 206. If images are received from the camera 206, the controller 316 could perform optical character recognition or other processing to extract readings from the images. The controller 316 can associate the images or readings with the appropriate identifiers, thereby associating particular images or readings with particular gauges or other visual indicators. The controller 316 can also timestamp the images or readings, thereby associating the particular images or readings with a particular date and time.

The controller 316 could use this data in any suitable manner. For example, the controller 316 could store the data in a memory 318 for later use or retrieval. This may allow, for example, the recording device 208 to record data for multiple gauges and then download the data at a later time. The controller 316 could also provide the data to at least one interface 320 for transmission over a wired or wireless connection to one or more destinations. The controller 316 includes any hardware, software, firmware, or combination thereof for controlling the overall operation of the recording device 208, such as a processor, microprocessor, microcontroller, field programmable gate array, or other processing or control device. The controller 316 could also perform other operations, such as extracting readings from captured images of gauges or other visual indicators.

The memory 318 stores information used, collected, or generated by the recording device 208, such as images or readings associated with gauges or other visual indicators. The memory 318 could also store identifiers obtained by the identification reader 314 and timestamps generated by the controller 316. The memory 318 includes any suitable volatile and/or non-volatile storage and retrieval device(s).

At least one interface 320 supports communications over any suitable wireless or wired connection(s). For example, an interface 320 could allow the recording device 208 to communicate with the camera 206 over a wired or wireless link. The same or different interface 320 could allow the recording device 208 to communicate over a wireless network (such as the one formed by the infrastructure nodes). Each interface 320 includes any suitable structure facilitating communication with the recording device 208. The interface(s) 320 could, for example, represent an interface to a wired connection between the camera 206 and the recording device 208, a Bluetooth transceiver, or a transceiver suitable for communications with a wireless network (such as an 802.11-based transceiver).

Although FIG. 3 illustrates additional details of one example of a reading device 120 for reading gauges or other visual indicators in a process control system or other system, various changes may be made to FIG. 3. For example, the camera 206 or recording device 208 could include other or additional components supporting other or additional functionality. Also, the functional division shown in FIG. 3 is for illustration only. Various components in FIG. 3 could be combined, omitted, or subdivided and additional components could be added according to particular needs. As a particular example, the controller 316 in the recording device 208 could perform some or all of the operations performed by the controller 306 in the camera 206. In these embodiments, the output of the image recorder 304 could be provided directly to the interface 310 or directly to the controller 316. In addition, the camera 206 is shown in FIG. 3 as being in wireless communication with a separate recording device 208, although other embodiments of the reading device 120 could be used.

Figure 4:
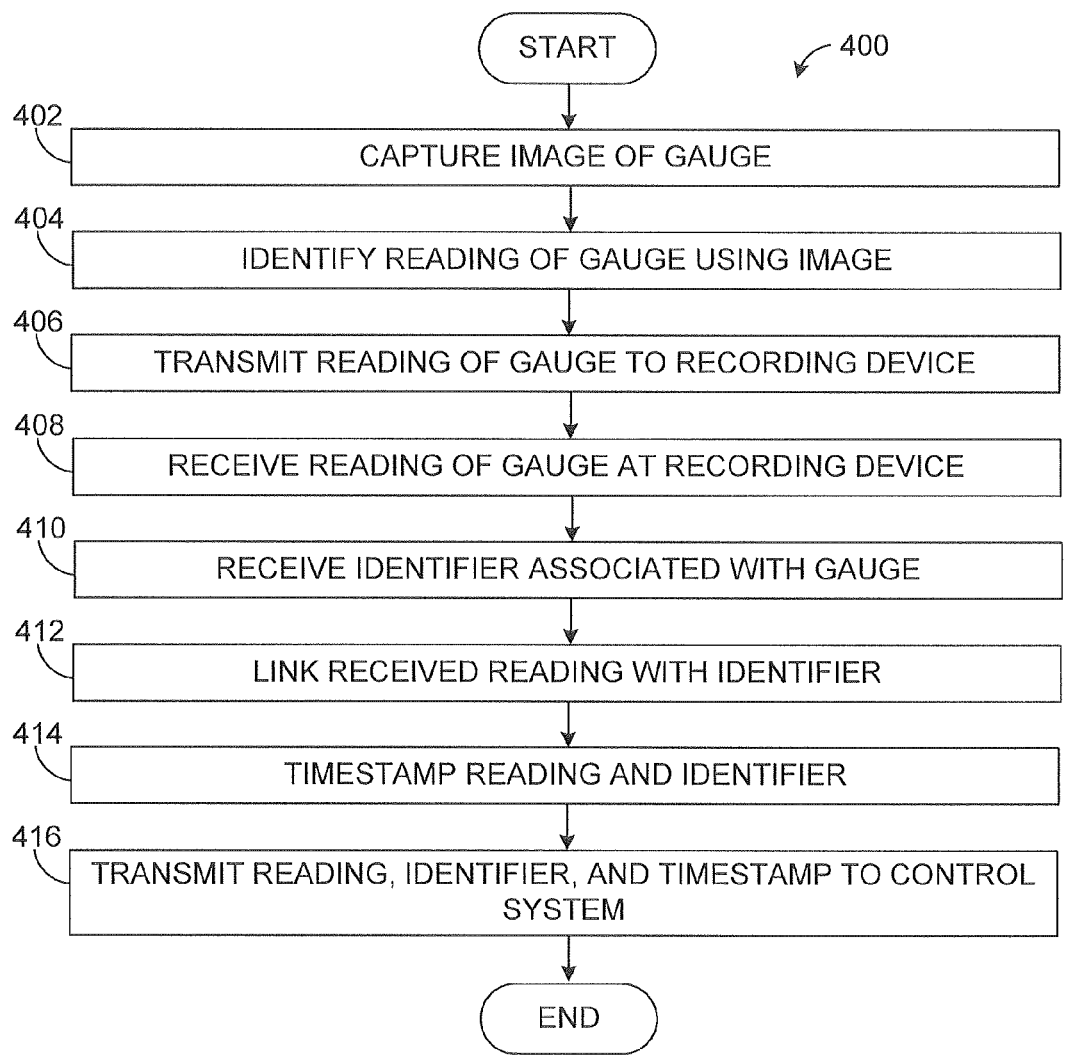
FIG. 4 illustrates an example method for reading gauges or other visual indicators in a process control system or other system according to this disclosure.

FIG. 4 illustrates an example method 400 for reading gauges or other visual indicators in a process control system or other system according to this disclosure. The embodiment of the method 400 shown in FIG. 4 is for illustration only. Other embodiments of the method 400 could be used without departing from the scope of this disclosure.

As shown in FIG. 4, a camera captures an image associated with a gauge or other visual indicator at step 402. This could include, for example, the lens system 302 of the camera 206 focusing light from a gauge 202 onto the image recorder 304. This could also include the image recorder 304 generating image data representing the focused image. The data generated by the image recorder 304 could have any suitable format, such as a black/white or color image. This could further include the controller 306 storing the image data in the memory 308.

The camera identifies a reading of the gauge or other indicator using the captured image at step 404. This could include, for example, the controller 306 in the camera 206 performing optical character recognition or other processing to identify a reading of the gauge or other indicator contained in the captured image.

The reading is transmitted to a recording device at step 406. This could include, for example, the controller 306 providing the reading to the interface 310 for communication to the recording device 208. The recording device receives the reading associated with the gauge or other visual indicator at step 408. This could include, for example, the interface 320 in the recording device 208 receiving the reading from the camera 206 and passing the reading to the controller 316.

The recording device receives an identifier associated with the gauge or other visual indicator being read at step 410. This could include, for example, the identification reader 314 receiving an RFID or other identifier from the identification tag 312 and passing the identifier to the controller 316.

The recording device links the received reading with the received identifier at step 412. This could include, for example, the controller 316 storing the received reading and the received identifier in a common data structure in the memory 318. Note that any suitable technique for associating a received reading with a received identifier could be used.

The recording device timestamps the data at step 414. This could include, for example, the controller 316 identifying a current date and time and associating the current date and time with the linked data. The timestamp could, for instance, be stored in the common data structure in which the reading and the identifier are stored. Note that any suitable technique for associating a timestamp with other data could be used.

The reading, the identifier, and the timestamp are transmitted to a control system at step 416. This could include, for example, the controller 316 retrieving the data from the memory 318 and providing the data to the interface 320 for transmission. The data could be transmitted immediately upon capture of the data, or the data could be transmitted at a later time. The data could also be transmitted to any suitable destination(s), such as to a controller 104, a control room 116, or a historian 118.

Although FIG. 4 illustrates one example of a method for reading gauges or other visual indicators in a process control system or other system, various changes may be made to FIG. 4. For example, while shown as a series of steps, various steps in FIG. 4 could overlap, occur in parallel, occur in a different order, or occur multiple times. As a particular example, the recording device 208 could extract a reading from an image, and the camera 206 could transmit an image rather than a reading to the recording device 208. Similarly, an external component (such as the image processor 122) could extract a reading from an image, the camera 206 could transmit an image to the recording device 208, and the recording device 208 could associate the identifier and timestamp with an image. Further, note that these steps could occur at any suitable time, such as in response to a command from a user or external device or system.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A portable apparatus comprising:
an attachment interface configured to removably mount the apparatus to multiple visual indicators including a plurality of different gauges of different sizes or different structures;
a camera configured to capture images of the multiple visual indicators, each visual indicator having an associated unique identifier and comprising a display configured to present a gauge reading; and
a recording device configured to:
perform optical character recognition on the captured images received from the camera to identify at least part of the gauge readings presented on the displays of the visual indicators;
identify timestamps of the captured images received from the camera;
identify the unique identifiers for the visual indicators using an identification reader separate from the camera;
associate each of the identified gauge readings and the identified timestamps with one of the visual indicators based on the identification of the unique identifiers; and
at least one of store and transmit information including the identified gauge readings, the identified timestamps, and the identified unique identifiers of the visual indicators.

2. The apparatus of claim 1, wherein the camera is configured to be mounted on each visual indicator in order to capture one or more images of the visual indicator's display and to be removed from the visual indicator after the one or more images are captured.

3. The apparatus of claim 1, wherein the captured images include the readings presented on the displays of the visual indicators.

4. The apparatus of claim 1, wherein the displays comprise textual displays.

5. The apparatus of claim 1, wherein the recording device is configured to link each of the identified gauge readings and the identified timestamps to one of the identified identifiers.

6. The apparatus of claim 1, wherein the identification reader includes a radio frequency identification (RFID) reader and the unique identifiers are RFID identifiers.

7. The apparatus of claim 1, wherein the camera comprises:
an image capture unit configured to capture the images;
a memory configured to store at least one of the images; and
an interface configured to transmit the images to the recording device.

8. The apparatus of claim 1, wherein the recording device comprises:
a memory configured to store the identified gauge readings, the identified timestamps, and the identified unique identifiers; and
an interface configured to transmit the identified gauge readings, the identified timestamps, and the identified unique identifiers.

9. The apparatus of claim 1, wherein:
the visual indicators comprise one or more meters; and
the displays comprise one or more dials.

10. The apparatus of claim 1, wherein at least one of the visual indicators identifies one or more of: a temperature, a pressure, a flow rate, a gas usage, a water usage, and an electrical usage.

11. A method comprising:
removably coupling a reading device to multiple visual indicators including a plurality of different gauges of different sizes or different structures, each visual indicator having an associated unique identifier;
capturing an image of a first display of a first of the visual indicators using the reading device, the first display presenting a first gauge reading;
capturing an image of a second display of a second of the visual indicators using the reading device, the second display presenting a second gauge reading;
performing optical character recognition on the captured images to identify at least part of the first and second gauge readings presented on the first and second displays of the first and second visual indicators, respectively;
identifying timestamps of the captured images;
identifying the unique identifiers for the first and second visual indicators, respectively, using an identification reader separate from a camera used to capture the images;

associating the first gauge reading and one of the identified timestamps with the first visual indicator based on the identification of the unique identifier of the first visual indicator and associating the second gauge reading and another one of the identified timestamps with the second visual indicator based on the identification of the unique identifier of the second visual indicator; and at least one of storing and transmitting information including the first and second identified gauge readings, the identified timestamps, and the identified unique identifiers.

12. The method of claim 11, wherein removably coupling the reading device to multiple visual indicators comprises coupling the reading device to the first visual indicator; removing the reading device; and coupling the reading device to the second visual indicator.

13. The method of claim 11, wherein at least one of storing and transmitting the information comprises wirelessly transmitting the information.

14. The method of claim 11, wherein:
capturing the image of the first display of the first visual indicator using the reading device comprises mounting the camera on the first visual indicator and capturing the image of the first display of the first visual indicator using the camera; and capturing the image of the second display of the second visual indicator using the reading device comprises mounting the camera on the second visual indicator and capturing the image of the second display of the second visual indicator.

15. The method of claim 11, wherein the displays comprise one or more textual displays.

16. The method of claim 12, wherein associating comprises linking each of the identified gauge readings and the identified timestamps to one of the identified identifiers.

17. The method of claim 16, wherein at least one of the visual indicators identifies one or more of: a temperature, a pressure, a flow rate, a gas usage, a water usage, and an electrical usage.

18. A system comprising:
multiple visual indicators, each visual indicator having an associated unique identifier and comprising a display configured to present a gauge reading; and
a reading device configured to:
removably mount to the multiple visual indicators including a plurality of different gauges of different sizes or different structures;
capture images of two or more of the visual indicators;
perform optical character recognition on the captured images to identify at least part of the gauge readings presented on the displays of the visual indicators;
identify timestamps of the captured images;
identify the unique identifiers for the visual indicators using an identification reader separate from a camera used to capture the images;
associate each gauge reading and each of the identified timestamps with one of the visual indicators based on the identification of the unique identifiers; and
at least one of store and transmit information including the identified gauge readings, the identified timestamps, and the identified unique identifiers.

19. The system of claim 18, wherein the reading device is configured to be mounted on each of the visual indicators in order to capture one or more images of the display of each of the visual indicators.

20. The system of claim 18, wherein the reading device is configured to link each of the identified gauge readings and the identified timestamps to one of the identified identifiers.

* * * * *